United States Patent

Ishikawa et al.

Patent Number: 5,461,099
Date of Patent: Oct. 24, 1995

[54] POLYIMIDE VARNISH

[75] Inventors: Motoaki Ishikawa; Makoto Mishina; Yoshihiro Tsuruoka, all of Funabashi, Japan

[73] Assignee: Nissan Chemical Industries, Ltd., Tokyo, Japan

[21] Appl. No.: 362,870

[22] Filed: Dec. 23, 1994

[30] Foreign Application Priority Data

Dec. 24, 1993 [JP] Japan ..................... 5-327087

[51] Int. Cl.$^6$ ................ C08J 3/11; C08K 5/10; C08L 79/08
[52] U.S. Cl. ............ 524/317; 524/320; 524/600; 528/348; 528/350; 528/351; 528/353
[58] Field of Search ................ 524/290, 291, 524/300, 308, 317, 320, 600, 99, 233, 234, 136, 111, 173; 528/348, 350, 351, 353

[56] References Cited

U.S. PATENT DOCUMENTS

| | | | |
|---|---|---|---|
| 4,863,828 | 9/1989 | Kawabe et al. | 430/191 |
| 5,302,489 | 4/1994 | Shu | 430/191 |

FOREIGN PATENT DOCUMENTS 0448248  9/1991  European Pat. Off. .

OTHER PUBLICATIONS

Patent Abstracts of Japan, vol. 18, No. 17 (E1488) (6357), Jan. 12, 1994, JP-5-258611, Oct. 8, 1993.

Patent Abstracts of Japan, vol. 18, No. 668 (C-1289) (7008), Dec. 16, 1994, JP-6-264026, Sep. 30, 1994.

*Primary Examiner*—Paul R. Michl
*Assistant Examiner*—U. K. Rajguru
*Attorney, Agent, or Firm*—Oblon, Spivak, McClelland, Maier, & Neustadt

[57] ABSTRACT

A polyimide varnish which is a solution having a polyimide and/or a polyimide precursor dissolved in an organic solvent and which is useful for forming a polyimide coating film on a substrate by coating the solution on the substrate followed by heat treatment, wherein from 5 wt % to 60 wt % of the organic solvent is a lactic acid derivative of the formula (I):

$$R^1O-\underset{\underset{CH_3}{|}}{CH}-COO-R^2 \qquad (I)$$

wherein each of $R^1$ and $R^2$ which are independent of each other, is hydrogen, a $C_{1-5}$ alkyl group or a $C_{1-5}$ alkenyl group.

5 Claims, No Drawings

POLYIMIDE VARNISH

The present invention relates to a polyimide varnish. More particularly, it relates to a polyimide varnish which is a solution having a polyimide and/or a polyimide precursor dissolved in an organic solvent and which is useful for forming a smooth polyimide coating film on a substrate by coating the solution on the substrate followed by heat treatment.

By virtue of their characteristic high mechanical strength, heat resistance and solvent resistance, polyimides are widely used as protecting materials or insulating materials in the electric and electronic fields. They are usually used to form thin polyimide coating films on various substrates. Specifically, when they are used as insulating films for semiconductors, they are usually used to form polyimide coating films of from 1 μm to 10 μm on silicon substrates having wirings applied thereto, and when they are used as liquid crystal alignment films, they are usually used to form polyimide coating films of from 0.05 μm to 0.2 μm on transparent substrates provided with transparent electrodes. To form such a polyimide coating film, it is common to coat on a substrate a polyimide varnish obtained by dissolving a polyimide or a polyimide precursor in a suitable organic solvent, by a method such as spin coating, offset printing or gravure printing, followed by heat treatment.

When a polyimide coating film is formed on a substrate, fluidity of the solution after coating is important to form a smooth film, since the irregularities on the coating film surface will be smoothed by the flow of the solution.

However, conventional solvents for polyimides usually have a high surface tension, whereby the fluidity is rather poor. Japanese Examined Patent Publication No. 81167/1992 proposes a method of incorporating butyl cellosolve to lower the surface tension of the solution. However, butyl cellosolve is not preferred from the practical viewpoint, since its toxicity is pointed out.

Under the circumstances, it is an object of the present invention to provide a polyimide varnish which is a solution of a polyimide and/or a polyimide precursor and which is useful for forming a polyimide coating film to be used, for example, as an insulating film or a protective film for an electrical or electronic device or as a liquid crystal alignment film, by coating the solution on a substrate, whereby a smooth polyimide coating film can be formed.

Thus, the present invention provides a polyimide varnish having a polyimide and/or a polyimide precursor dissolved in an organic solvent, wherein from 5 wt % to 60 wt % of the organic solvent is a lactic acid derivative of the formula (I):

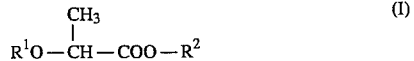
(I)

wherein each of $R^1$ and $R^2$ which are independent of each other, is hydrogen, a $C_{1-5}$ alkyl group or a $C_{1-5}$ alkenyl group.

By the incorporation of the lactic acid derivative of the formula iI) of the present invention, it is possible to uniformly and flatly coat the polyimide varnish on the substrate.

The polyimide and/or the polyimide precursor to be used for the polyimide varnish of the present invention is not particularly limited. Usually, it is common to react and polymerize a tetracarboxylic acid derivative with a primary diamine to obtain a polyimide precursor which is subjected to ring closure imide-conversion to obtain a polyimide.

Specific examples of the tetracarboxylic acid derivative to be used for obtaining the polyimide and/or the polyimide precursor of the present invention include aromatic tetracarboxylic acids such as pyromellitic acid, 2,3,6,7-naphthalenetetracarboxylic acid, 1,2,5,6-naphthalenetetracarboxylic acid, 1,4,5,8-naphthalenetetracarboxylic acid, 2,3,6,7-anthracenetetracarboxylic acid, 1,2,5,6-anthracenetetracarboxylic acid, 3,3'4,4'-biphenyltetracarboxylic acid, 2,3,3'4'-biphenyltetracarboxylic acid, bis (3,4-dicarboxyphenyl) ether, 3,3'4,4'-benzophenonetetracarboxylic acid, bis( 3,4-dicarboxyphenyl ) sulfone, bis(3,4-dicarboxyphenyl)methane, 2,2-bis(3,4-dicarboxyphenyl)propane, 1,1,1,3,3,3-hexafluoro-2,2-bis( 3,4-dicarboxyphenyl)propane, bis(3,4-dicarboxyphenyl)dimethylsilane, bis(3,4dicarboxyphenyl)diphenylsilane, 2,3,4,5-pyridinetetracarboxylic acid and 2,6-bis(3,4-dicarboxyphenyl)pyridine, and their dianhydrides as well as their dicarboxylic acid diacid halides; alicyclic tetracarboxylic acids such as 1,2,3,4-cyclobutanetetracarboxylic acid, 1,2,3,4-cyclopentanetetracarboxylic acid, 1,2,4,5-cyclohexanetetracarboxylic acid, 2,3,5-tricarboxycyclopentylacetic acid and 3,4-dicarboxy-1,2,3,4-tetrahydro-1-naphthalenesuccinic acid, and their dianhydrides as well as their dicarboxylic acid diacid halides; and aliphatic tetracarboxylic acids such as 1,2,3,4-butanetetracarboxylic acid, and their dianhydrides as well as their dicarboxylic acid diacid halides.

Specific examples of the diamine to be used for obtaining the polyimide and/or the polyimide precursor of the present invention include aromatic diamines such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenyl ether, 2,2-diaminodiphenylpropane, bis(3,5-diethyl-4-aminophenyl)methane, diaminodiphenyl sulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenyl sulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; alicyclic diamines such as bis(4-aminocyclohexyl)methane and bis(4-amino-3-methylcyclohexyl)methane; and aliphatic diamines such as tetramethylenediamine and hexamethylenediamine, as well as diaminosiloxanes of the formula (II):

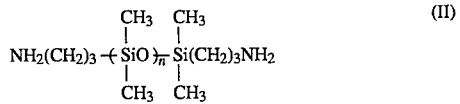
(II)

wherein n is an integer of from 1 to 10.

The tetracarboxylic acid derivative and the diamine are reacted and polymerized to obtain a polyimide precursor. As the tetracarboxylic acid derivative to be used here, it is common to employ a tetracarboxylic acid dianhydride. The molar ratio of the tetracarboxylic acid dianhydride to the diamine is preferably from 0.8 to 1.2. Like a usual polycondensation reaction, the polymerization degree of the resulting polymer increases as this molar ratio becomes close to 1.

If the polymerization degree is too low, the strength of the polyimide coating film tends to be inadequate. On the other hand, if the polymerization degree is too high, the operation efficiency for forming the polyimide coating film is likely to be poor.

Accordingly, the polymerization degree of the product in the present reaction is preferably at a level of from 0.05 dl/g to 5.0 dl/g (in N-methylpyrrolidone at a temperature of 30° C., concentration: 0.5 g/dl) as calculated as the reduced viscosity of the polyimide precursor solution.

The method for reacting and polymerizing the tetracarboxylic acid dianhydride with the diamine is not particularly limited. Usually, the diamine is dissolved in an organic polar solvent such as N-methylpyrrolidone, N,N-dimethylacetamide or N,N-dimethylformamide, and the tetracarboxylic acid dianhydride is added and reacted to the solution to obtain a polyimide precursor. As the temperature for the reaction, any optional temperature from −20° C. to 150° C., preferably from −5° C. to 100° C., may be selected.

Polyimides tend to be insoluble in organic solvents after the imide-conversion in many cases. Accordingly, it is usual to employ a method wherein the polyimide precursor is dissolved in an organic solvent to obtain a varnish, and this varnish is coated on a substrate and subjected to heat treatment on the substrate for imide-conversion to form a polyimide coating film on the substrate.

Here, the temperature for heating on the substrate for imide-conversion may be at an optional level of from 100° C. to 400° C. However, a temperature within a range of from 150° C. to 350° C. is particularly preferred.

On the other hand, when a polyimide is soluble in a solvent, it is possible to employ a method wherein a polyimide precursor is subjected to imide-conversion, and the obtained polyimide is dissolved in an organic solvent to obtain a varnish, which is then coated on a substrate, and then the substrate is subjected to heat treatment to evaporate the solvent to form a polyimide coating film on the substrate.

Here, as the method for imide-conversion of the polyimide precursor, a method for dehydration ring closure by heating in a solution, may be employed. The temperature for ring closure by dehydration under heating can be selected at an optional level within a range of from 100° C. to 350° C., preferably from 120° C. to 250° C.

As another method for converting the polyimide precursor to a polyimide, it is possible to carry out the ring closure chemically by means of a conventional catalyst for dehydration ring closure.

The polyimide varnish of the present invention is a varnish having the above polyimide and/or the polyimide precursor dissolved in an organic solvent, and from 5 wt % to 60 wt %, preferably from 10 wt % to 50 wt %, of the organic solvent constituting this varnish must be a lactic acid derivative of the formula (I).

Specific examples of the lactic acid derivative include methyl lactate, ethyl lactate, n-propyl lactate, n-butyl lactate and isoamyl lactate. Particularly preferred is n-butyl lactate.

Such a lactic acid derivative must be at least 5 wt % of the total amount of the solvent constituting the polyimide varnish of the present invention. Otherwise, the effect for smoothing the coating film tends to be inadequate. Such a lactic acid derivative can not usually dissolve the polyimide and/or the polyimide precursor by itself. Therefore, if it exceeds 60 wt % of the total amount of the solvent, precipitation of the polymer tends to take place, whereby the stability of the varnish tends to be poor, such being undesirable.

Of the entire solvent constituting the polyimide varnish of the present invention, the solvent other than the above-described lactic acid derivative is not particularly limited so long as it is capable of dissolving the polyimide and/or the polyimide precursor.

For example, it may be 2-pyrrolidone, N-methylpyrrolidone, N,N-dimethylacetamide, N,N-dimethylformamide, dimethyl sulfoxide, hexamethylphosphoramide or γ-butyrolactone.

In addition, even a solvent which is incapable of dissolving the polyimide and/or the polyimide precursor by itself, may be added to the above solvent within a range not to impair the solubility.

The method for dissolving the polyimide and/or the polyimide precursor in the above solvent to obtain a polyimide varnish, is not particularly limited.

For example, the reaction-polymerization solution of the above polyimide and/or the polyimide precursor may be used as it is. Otherwise, the resulting polyimide and/or the polyimide precursor is put into a large excess amount of water or a poor solvent such as methanol to recover it as a precipitate, which is again dissolved in the above solvent for use.

The amount of the resin content in the polyimide varnish varies depending upon the particular purpose of the varnish and is not particularly limited. However, it is usually from 2 wt % to 15 wt % in the case of a liquid crystal alignment film, and it is usually from 5 wt % to 30 wt % in the case of an insulating film.

Further, for the purpose of further improving the adhesion between the finally formed polyimide coating film and the substrate, an additive such as a coupling agent may also be incorporated as a component of the polyimide varnish of the present invention.

The polyimide varnish of the present invention is coated on a substrate and subjected to heat treatment to form a polyimide coating film having a uniform thickness on the substrate, which is then useful as an insulating film or a protective film of an electric or electronic device, or as an alignment film for a liquid display device.

Here, the coating method is not particularly limited. However, it s common to employ, for example, spin coating, roll coating, offset printing or gravure printing.

As the temperature for the heat treatment to form a polyimide coating film, a temperature for converting the polyimide precursor to the polyimide is necessary in a case where the polyimide varnish is a polyimide precursor solution. As such a temperature, an optional temperature within a range of from 100° C. to 350° C., preferably from 120° C. to 250° C., may be selected. In a case where the polyimide varnish is a polyimide solution, the temperature for heat treatment may be at such a level where the solvent evaporates, and it is usually from 80° C. to 150° C.

The substrate on which the polyimide coating film is to be formed, may suitably be selected depending upon the particular purpose of the polyimide coating film. For example, in the case of an insulating film or a protective film for semiconductor devices, it may be a silicon substrate having various wirings applied thereto. In the case of a liquid crystal orientation film, the substrate is a glass sheet or a plastic film provided with a transparent electrode.

Now, the present invention will be described in further detail with reference to Examples. However, the present invention is by no means restricted to such specific Examples.

EXAMPLE 1

41.0 g (0.1 mol) of 2,2-bis[4-(4-aminophenoxy)phenyl]propane and 19.2 g (0.098 mol) of 1,2,3,4-cyclobutanetetracarboxylic dianhydride were reacted in 340 g of N-methylpyrrolidone (hereinafter referred to as NMP) at room temperature for 10 hours to obtain a polyimide precursor solution. The reduced viscosity ($\eta sp/c$) of the obtained polyimide precursor was 1.02 dl/g (0.5 wt % NMP solution, at 30° C.).

To 12 g of this solution, 12 g of NMP and 6 g of n-butyl lactate were added to obtain a varnish having a total solid content of 6 wt %, which was printed on a glass substrate provided with a transparent electrode, by flexo printing, followed by drying and curing at 180° C. The obtained coating film was a smooth film without irregularities.

COMPARATIVE EXAMPLE 1

To 12 g of the polyimide precursor solution prepared in Example 1, 18 g of NMP was added to obtain a varnish having a total solid content of 6 wt %, which was printed on a glass substrate provided with a transparent electrode, by flexo printing, followed by drying and curing at 180° C. The obtained coating film had fine irregularities and cissing observed on the surface, and it was impossible to obtain a smooth film.

EXAMPLE 2

To 12 g of the polyimide precursor solution prepared in Example 1, 6 g of n-butyl lactate was added to obtain a varnish having a total solid content of 12 wt %, which was spin-coated on a glass substrate provided with a transparent electrode, at a rotational speed of 2,000 rpm, followed by drying and curing at 180° C. to obtain a polyimide coating film having a thickness of about 3 μm. The obtained coating film was a smooth film without irregularities.

COMPARATIVE EXAMPLE 2

To 12 g of the polyimide precursor solution prepared in Example 1, 3 g of NMP was added to obtain a varnish having a total solid content of 12 wt %, which was spin-coated on a glass substrate provided with a transparent electrode, at a rotational speed of 2,000 rpm, followed by drying and curing at 180° C. to obtain a polyimide coating film having a thickness of about 3 μm. The obtained coating film had fine irregularities observed on its surface, and it was impossible to obtain a smooth film.

The polyimide varnish of the present invention may be coated on various substrates and subjected to heat treatment to form polyimide coating films, which are useful as insulating films or protective films for electrical or electronic devices, or as liquid crystal alignment films. It is thereby possible to form smooth coating films without irregularities.

We claim:

1. A polyimide varnish which is a solution having a polyimide and/or a polyimide precursor dissolved in an organic solvent and which is useful for forming a polyimide coating film on a substrate by coating the solution on the substrate followed by heat treatment, wherein from 5 wt % to 60 wt % of the organic solvent is a lactic acid derivative of the formula (I):

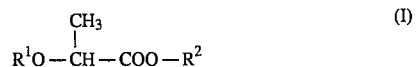

wherein each of $R^1$ and $R^2$ which are independent of each other, is hydrogen, a $C_{1-5}$ alkyl group or a $C_{1-5}$ alkenyl group.

2. The polyimide varnish according to claim 1, wherein the lactic acid derivative of the formula (I) is at least one lactic acid derivative selected from the group consisting of methyl lactate, ethyl lactate, n-propyl lactate, n-butyl lactate and isoamyl lactate.

3. The polyimide varnish according to claim 2, wherein the lactic acid derivative of the formula (I) is n-butyl lactate.

4. The polyimide varnish according to claim 1, wherein said resin content in the polyimide varnish is from 2 wt % to 15 wt % based on total wt of said varnish.

5. The polyimide varnish according to claim 1, wherein said resin content in the polyimide varnish is from 5 wt % to 30 wt % based on total wt of said varnish.

* * * * *